United States Patent [19]

Nishimura et al.

[11] Patent Number: 4,541,515
[45] Date of Patent: Sep. 17, 1985

[54] APPARATUS FOR SUPPLYING HYDRAULIC FLUID TO AN HYDRAULIC CLUTCH

[75] Inventors: Sadanori Nishimura; Katsuharu Kinoshita, both of Saitama, Japan

[73] Assignee: Honda Giken Kogyo Kabushiki Kaisha, Tokyo, Japan

[21] Appl. No.: 445,161

[22] Filed: Nov. 29, 1982

[30] Foreign Application Priority Data

Dec. 11, 1981 [JP] Japan .................. 56-183519[U]

[51] Int. Cl.⁴ .................. F16D 25/063; F16D 25/10
[52] U.S. Cl. .................. 192/85 AA; 192/87.1; 74/789; 74/359
[58] Field of Search ......... 192/85 AA, 87.1, 87.13, 192/87.18; 74/359, 364, 789, 752 C, 867, 791, 790; 277/177

[56] References Cited

U.S. PATENT DOCUMENTS

| | | | |
|---|---|---|---|
| 2,231,411 | 2/1941 | Lawrence | 192/48 |
| 2,888,842 | 6/1959 | Ahlen | 74/752 C |
| 2,924,983 | 2/1960 | Curran | 74/330 |
| 3,162,063 | 12/1964 | Konrad | 74/763 |
| 3,301,367 | 1/1967 | Yokel | 192/113 |
| 3,393,586 | 7/1968 | Zundel | 74/878 |
| 4,252,031 | 2/1981 | Nishimura et al. | 74/360 |

FOREIGN PATENT DOCUMENTS

| | | | |
|---|---|---|---|
| 728830 | 7/1932 | France | 74/789 |
| 218715 | 12/1941 | Italy | 74/789 |
| 53-50761 | 11/1979 | Japan | 192/87.13 |
| 792856 | 4/1958 | United Kingdom | 192/85 AA |

Primary Examiner—Allan D. Herrmann
Assistant Examiner—Shirish Desai
Attorney, Agent, or Firm—Lyon & Lyon

[57] ABSTRACT

Hydraulically operated friction clutches mounted on a rotary shaft within a stationary case receive hydraulic fluid through a longitudinal bore in the shaft communicating with a pressure chamber in each of the clutches. Concentric stationary oil feeding pipes extend axially into one end of said bore, and bushings are provided in the bore for an end portion of each pipe. Stationary supporting members are provided for each pipe, these supporting members each comprising a thin annular plate having inner and outer portions in the same plane and the central portion axially offset therefrom. Sealing rings are clamped between the outer periphery of each supporting member and the case, and additional sealing rings are clamped between each pipe and the supporting member, respectively.

2 Claims, 3 Drawing Figures

APPARATUS FOR SUPPLYING HYDRAULIC FLUID TO AN HYDRAULIC CLUTCH

This invention relates to apparatus for supplying hydraulic fluid to an hydraulically operated clutch, the clutch being mounted on a rotary shaft within a stationary case. Apparatus of this type finds particular usefulness in connection with the change speed transmission of a vehicle.

Hydraulically operated friction clutches have been previously employed within a case and encircling a rotary shaft, but the overall axial length of the apparatus for supplying the hydraulic fluid has been excessive. It is an object of the present invention to reduce the overall axial length of such apparatus without adversely affecting its sealing qualities.

Other and more detailed objects and advantages will appear hereinafter.

Figure 3:
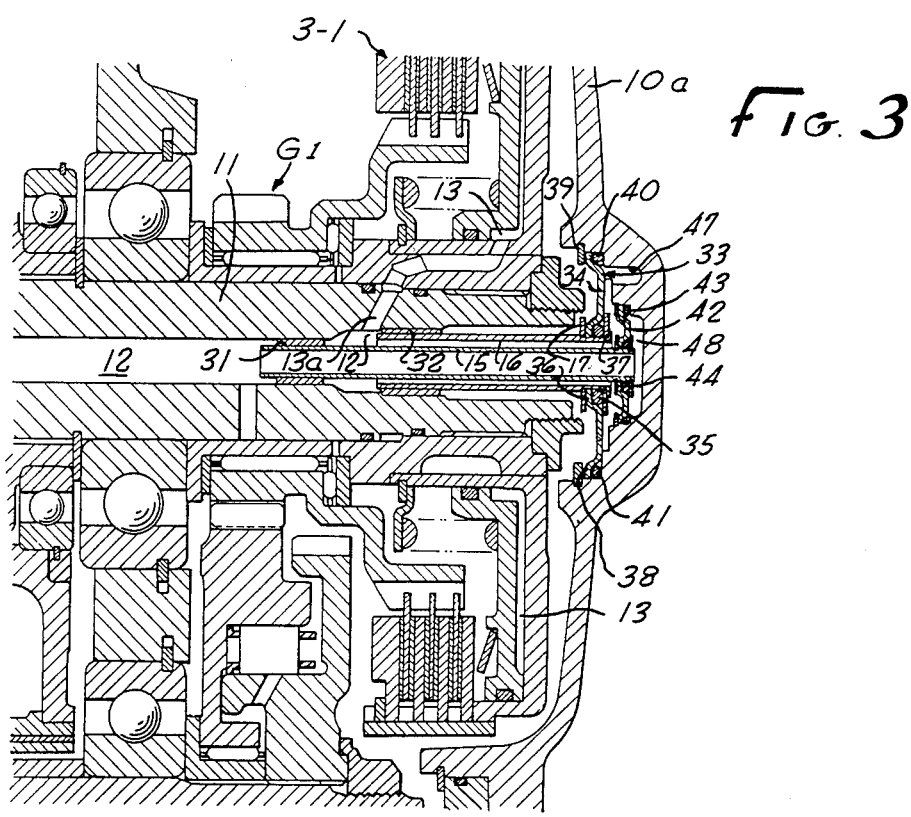
Figure 2:
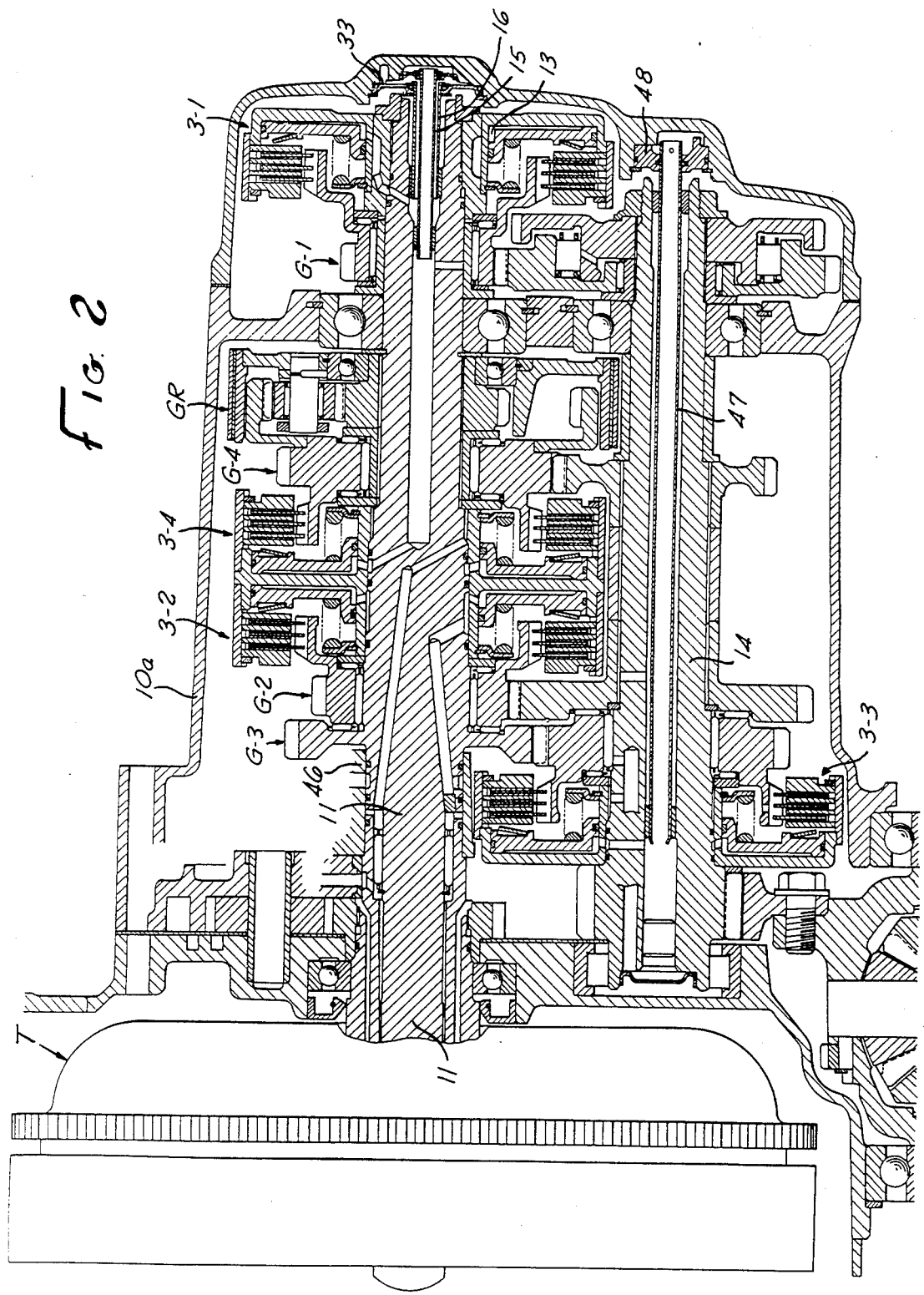
FIG. 2 is a sectional elevation showing a preferred embodiment of this invention.

FIG. 3 constitutes an enlargement of the right-hand portion of FIG. 2.

Figure 1:
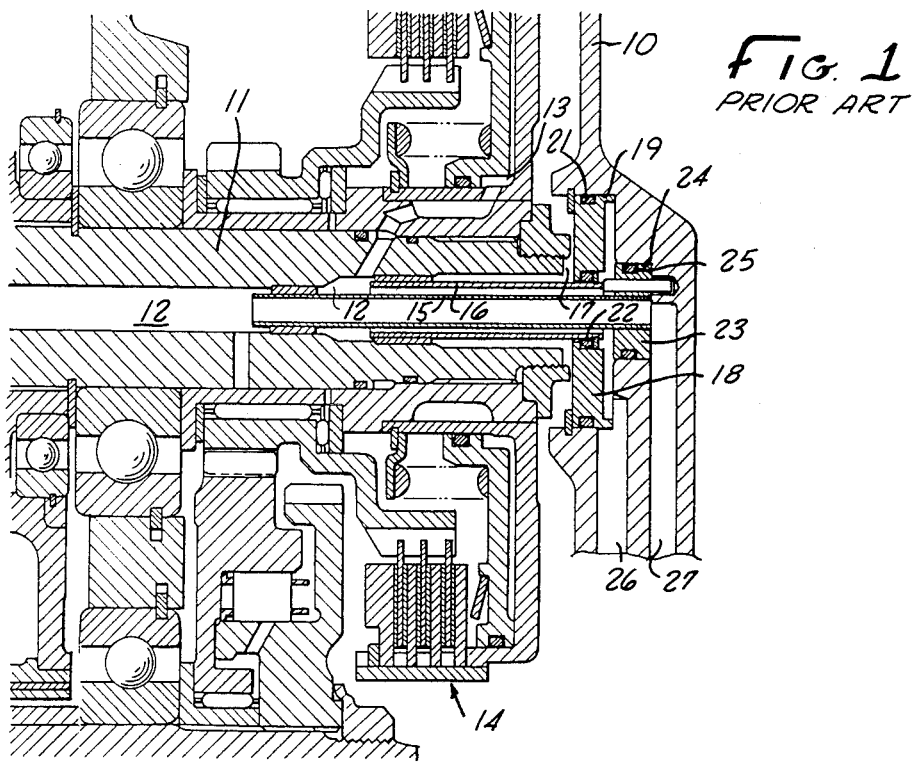
FIG. 1 is a sectional elevation showing a device of the prior art.

Referring to the drawings, the prior art device illustrated in FIG. 1 has a transmission case 10 supporting a rotary shaft 11 which has a longitudinal bore 12. This bore 12 communicates with a pressure chamber 13 of an hydraulic friction clutch 14. Concentric oil feeding pipes 15 and 16 are inserted axially into the bore 12 through an open end 17 of the shaft 11. These pipes 15 and 16 do not rotate. The outer pipe 16 is carried by a relatively thick collar 18 received in a recess 19 in the transmission case 10. The collar carries a peripheral seal ring 21 and an inner seal ring 22. The inner pipe 15 is fixed within a smaller collar 23 fitted into a recess 24. The collar 23 has a peripheral seal ring 25 engaging the outer wall of the recess 24.

In operation of this prior art device, hydraulic fluid is supplied from the passage 26 into the pressure chamber 13 by way of the annular space between the concentric pipes 15 and 16. The passage 27 supplies hydraulic fluid through the interior of the inner pipe 15 through the shaft bore 12 to another hydraulically operated friction clutch, not shown.

The prior art device shown in FIG. 1 performs the supply and exhaust operation of hydraulic fluid between the stationary parts and the rotary parts, by means of the concentric pipes 15 and 16. However, the supporting collars 18 and 23 are formed of castings and have grooves for receiving seal rings, and therefore are necessarily relatively thick in the axial direction.

An important object of the present invention is to provide apparatus for supplying hydraulic fluid to an hydraulically operated friction clutch, which device has a minimum axial size, determined by the thickness of the supporting member, and which exhibits satisfactory performance of oil sealing. In the preferred form of the invention shown in FIGS. 2 and 3, the transmission case 10a supports the rotary shaft 11 having an axial bore 12. This bore communicates with the pressure chamber 13 by way of passage 13a to operate the friction clutch 3-1. Concentric pipes 15 and 16 project into the open end 17 of the shaft 11 and their projecting ends are supported by bushings 31 and 32. A thin annular support member 33 is provided for the outer pipe 16. This comprises radially extending inner and outer portions in approximately the same plane, joined by an offset annular portion 34. A seal ring 35 encircles a portion of the pipe 16 adjacent the inner part of the thin support member 33, and retaining rings 36 and 37 clamp the seal ring in place. A recess 40 in the transmission case 10a receives the outer periphery 38 of the support member 33, and the retainer ring 39 clamps this portion 38 and the outer seal ring 41 in place.

A similar device, also thin in the axial direction, is provided for the inner pipe 15. The support member 42 has the same cross sectional shape as the support member 33 but is smaller in diameter. Its inner periphery is clamped about a sealing ring 44 between axially spaced retainer plates.

In the illustrated embodiment of this invention as shown in FIG. 2, the case 10a is adapted for use with a vehicle transmission having two parallel shafts. The input shaft 11 is coupled to a torque converter T, and an output shaft 14 is coupled to driving wheels of the vehicle. The transmission comprises a first speed gear G1 disposed for engagement with the first speed hydraulic clutch 3-1 positioned near the end of the input shaft 11. A second speed gear G2 is disposed for engagement with a second speed hydraulic clutch 3-2 mounted on the input shaft 11. A third speed gear G3 is disposed for engagement with a third speed hydraulic clutch 3-3 mounted on the output shaft 14. A fourth speed gear G4 is disposed for engagement with an intermediate fourth speed hydraulic clutch 3-4 arranged on the input shaft 11, and also with a reverse gear GR formed of a planetary gear device.

Oil feeding to the second speed hydraulic clutch 3-2 is effected in a conventional manner by means of the oil delivery member 46 mounted on the input shaft 11. Oil feeding to the third speed hydraulic clutch 3-3 is effected in a conventional manner by means of the stationary pipe 47 extending from the casting 48. The device of the present invention is applied to oil feeding to the first speed hydraulic clutch 3-1 and to the fourth speed hydraulic clutch 3-4.

Referring to FIG. 3, the dished spape of the members 34 and 42 contribute to their stiffness and oil pressures supplied to the interior of the pipe 16 from space 49 and through pipe 15 through space 50 tend to enhance the sealing effect of the rings 35, 41, 43 and 44. This construction reduces the axial length of the parts supporting the pipes 15 and 16, making it possible to reduce the entire axial size of the transmission.

Having fully described our invention, it is to be understood that we are not to be limited to the details herein set forth but that our invention is of the full scope of the appended claims.

We claim:

1. Apparatus for supplying hydraulic fluid to an hydraulically operated clutch, the clutch being mounted on a rotary shaft within a stationary case, the rotary shaft having a longitudinal bore communicating with a pressure chamber of the hydraulic clutch, comprising in combination: a stationary oil feeding pipe inserted coaxially into an open end of said bore and having a projecting portion supported by a bushing in said bore, a supporting member fitted on said pipe at a location remote from said bushing, said supporting member comprising a thin annular plate having inner and outer portions in substantially the same plane and a central portion axially offset therefrom, means for sealing and fixing said outer portion to said case including a first seal ring engaging the case and positioned on the same axial side of said outer portion as said central portion and a first thin retainer ring on the other axial side of said outer portion engaging the case and clamping said outer portion and sealing ring to the case, and means for sealing and fixing said inner portion to said pipe including a second seal ring engaging said pipe and positioned on the same axial side of said inner portion as said central portion and second and third thin retainer rings on opposite sides of said combined second seal and inner portion and engaging said pipe for clamping said second seal and inner portion to said pipe, said axial offset central portion of said support member radially confining said first seal ring outwardly against the case and said second seal ring inwardly against said pipe.

2. Apparatus for supplying hydraulic fluid to two hydraulically operated clutches mounted on a rotary shaft within a stationary case, the rotary shaft having a longitudinal bore communicating with a pressure chamber of each of the hydraulic clutches, comprising in combination: a first oil feeding pipe inserted coaxially into an open end of said bore and having a projecting portion supported by a first bushing in said bore, a supporting member fitted on said first pipe at a location remote from said bushing, a second oil feeding pipe within said first oil feeding pipe and having a projecting portion supported by a second bushing in said bore, a second supporting member fitted on said second pipe adjacent said first supporting member, said supporting members each comprising a thin annular plate having inner and outer portions in substantially the same plane and a central portion axially offset therefrom, means for separately sealing and fixing each outer portion of each support member to said case including a first seal ring engaging the case and positioned on the same axial side of said outer portion as said central portion and a first thin retainer ring on the other axial side of said outer portion engaging the case and clamping said outer portion and sealing ring to the case, and means for separately sealing and fixing each inner portion of each support member to the respective one of said pipes including a second seal ring engaging said pipe and positioned in the same axial side of said inner portion as said central portion and second and third thin retainer rings on opposite sides of said combined second seal and inner portion and engaging said pipe for clamping said second seal and inner portion to said pipe, said axial offset central portion of the said support member radially confining said first seal ring outwardly against the case and said second seal ring inwardly against said pipe.

* * * * *